US006158816A

United States Patent [19]

Howell et al.

[11] Patent Number: 6,158,816

[45] **Date of Patent: *Dec. 12, 2000**

[54] ENERGY ABSORBING TORSION BAR SEAT BELT RETRACTOR WITH SHARP ONSET PROPERTY

[75] Inventors: Jefferson E. Howell, Clinton Township, Macomb County; Simon X. He, Troy, both of Mich.

[73] Assignee: Breed Automotive Technology, Inc., Lakeland, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/964,900

[22] Filed: Nov. 5, 1997

[51] Int. Cl.[7] .......... A62B 35/04; B60R 22/28

[52] U.S. Cl. .......... 297/470; 297/472; 297/476; 297/478; 280/806; 242/379.1

[58] Field of Search .......... 297/470, 471, 297/472, 475, 476, 478; 250/806; 242/279.1

[56] References Cited

U.S. PATENT DOCUMENTS

| | | | |
|---|---|---|---|
| 3,012,667 | 1/2000 | Clancy, III et al. | 242/379.1 |
| 3,666,198 | 5/1972 | Neumann | 297/470 X |
| 3,741,494 | 6/1973 | Fiala | 242/379.1 |
| 3,765,700 | 10/1973 | Littman | 297/476 X |
| 3,790,099 | 2/1974 | Beller | 297/470 X |
| 3,857,528 | 12/1974 | Fiala | 242/379.1 |
| 3,961,761 | 6/1976 | Wiesböck | 242/379.1 |
| 4,322,046 | 3/1982 | Tanaka et al. | 242/379.1 |
| 5,154,368 | 10/1992 | Fujimura et al. | 297/472 X |
| 5,242,213 | 9/1993 | Föhl | 297/476 X |
| 5,255,868 | 10/1993 | Reulein | 297/470 X |
| 5,299,854 | 4/1994 | Fujimura et al. | 297/478 X |
| 5,320,385 | 6/1994 | Schmid et al. | 280/805 |
| 5,344,095 | 9/1994 | Frei | 242/374 |
| 5,364,168 | 11/1994 | Nishizawa | 297/476 |
| 5,367,917 | 11/1994 | Hishon et al. | 297/476 X |
| 5,516,199 | 5/1996 | Crook et al. | 297/470 X |
| 5,526,996 | 6/1996 | Ebner et al. | 242/379.1 X |
| 5,529,258 | 6/1996 | Dybro et al. | 280/806 X |
| 5,628,469 | 5/1997 | Föhl | 242/379.1 X |
| 5,738,293 | 4/1998 | Föhl | 242/379.1 X |
| 5,899,402 | 5/1999 | Koning | 242/379.1 |
| 5,934,597 | 8/1999 | Ludwig | 242/379.1 |
| 5,954,287 | 9/1999 | Hirase | 242/379.1 |
| 6,065,706 | 5/2000 | Koning | 242/379.1 |

FOREIGN PATENT DOCUMENTS

| | | |
|---|---|---|
| WO 97/49583 | 12/1999 | WIPO . |

*Primary Examiner*—Peter M. Cuomo
*Assistant Examiner*—Rodney B. White
*Attorney, Agent, or Firm*—Mark Seitzman

[57] ABSTRACT

An energy absorbing seat belt retractor (20) comprising: a frame (22); a torsion bar (70,70') having a first and a second side, rotationally supported relative to the frame. The torsion bar of the type which is pre-torqued to create a permanent deformation therein or having an annular cross section to reduce a transition zone between the torsion bar's elastic and plastic deformation regions. The retractor also includes a locking device (200) adapted to be activated during a vehicle accident and operative on the first side (76) of the torsion bar to stop the torsion bar from rotating. A spool is operatively connected to the second side of the torsion bar, the spool having a seat belt positioned thereon, wherein with the locking device activated to prevent the first side of the torsion bar from rotating and with a predetermined load communicated to the seat belt, the spool and the torsion bar rotate in a direction of belt protraction opposed by a reaction force generated by the pre-torqued torsion bar as it twists.

13 Claims, 11 Drawing Sheets

DEFLECTION

ENERGY ABSORBING TORSION BAR SEAT BELT RETRACTOR WITH SHARP ONSET PROPERTY

BACKGROUND AND SUMMARY OF THE INVENTION

The present invention generally relates to seat belt retractors and more particularly the class of retractors designated as energy absorbing retractors.

The classic type of seat belt retractor comprises a frame with a spool rotationally mounted upon the frame. The spool will typically include one or more lock wheels each having a plurality of teeth which are engaged by a corresponding lock pawl which is typically rotationally mounted to the frame and movable from a disengaged position to an engaged position in locking engagement with a tooth of the lock wheel. In another retractor the lock pawls are replaced by locking formations (or teeth) positioned in the frame and the spool is permitted to rotate or translate into locking engagement with these locking formations. This type of conventional seat belt retractor is known as a frame locking retractor. In either of these retractors once the spool is locked, further protraction of the seat belt is prohibited and the forward motion of the occupant is also generally restricted. As is known in the art, the seat belt is typically wound about the spool. One skilled in the art will appreciate that all forward motion of the occupant will not be stopped since as the occupant loads the locked retractor, the seat belt will be stressed and will stretch. The characteristic moduli of elasticity of a typical woven seat belt is between 8% and 16%.

In an energy absorbing retractor the spool is initially locked during the initial moments of an accident by means of a locking pawl activated by a vehicle sensor or a web sensor. Subsequently, as the accident progresses, momentum is transferred to the occupant and the occupant will tend to move forward against the seat belt and load the now locked retractor (as would happen with a conventional seat belt retractor). However, with an energy absorbing retractor the spool and its associated mechanisms are permitted to move and the seat belt is controllably permitted to protract in response to the load imparted to the seat belt by the occupant. The forward motion of the occupant is restricted by a reaction force or torque generated within the retractor. In this way the protraction of the seat belt and the forward motion of the occupant are controlled. Energy absorbing seat belt retractors often employ a deformable member such as a crushable bushing or a torsion bar. In either case, the bushing is crushed or the torsion bar rotated beyond its elastic limit into its plastic range or zone of operation to generate the desired (theoretically constant) reaction torque which acts against the forces imparted to the seat belt by the moving occupant and the torque transferred to the retractor spool.

The ultimate goal of an energy absorbing retractor is to generate a generally constant reaction force to oppose the forward motion of the occupant and to be able to generate this constant force during the entire time that the seat belt is loaded by the occupant. In theory this can be achieved by utilizing a material that effectively does not have an elastic zone and by always operating the crush bushing or the torsion bar in their constant plastic zone.

In prior art torsion bar seat belt retractors, one end of the torsion bar is fixedly attached to a lock wheel and the other end is fixedly fixed to the spool of the retractor. During an accident the lock wheel is prevented from rotating by interposing a lock dog or lock pawl within the teeth of the lock wheel. As the seat belt is loaded by the occupant, the spool will tend to rotate in opposition to the reaction torque generated within the torsion bar, as the torsion bar is twisted. The generated reaction torque depends upon the amount that the torsion bar is rotated or twisted as well as upon the physical characteristics of the torsion bar.

More specifically, the reaction torque generated by a torsion bar will vary depending upon whether the torsion bar is in its elastic, transition or plastic zones or ranges. As mentioned, in an ideal torsion bar, the elastic range is characterized by a steep (preferably infinitely steep slope or deflection curve) and the plastic range is characterized by a perfectly constant torque deflection region having a sharp transition from the elastic region. As such, once a first end of the torsion bar is locked and the spool loaded, the torsion bar will immediately make a transition from its elastic range into the plastic range of operation such that a constant reaction force is generated by the retractor as the seat belt is protracted.

It is an object of the present invention to provide a torsion bar which reduces the amount of rotation needed to generate a torque which approaches the idealized constant level, plastic reaction torque. A further object of the invention is to provide a torsion bar, energy absorbing seat belt retractor which generates a reaction torque force consistent with the torque levels achievable in the plastic zone when the seat belt is loaded by the occupant. Another object of the present invention is to provide a torsion bar seat belt retractor in which the torsion bar has a reduced transition zone. It is another object of the present invention to provide a torsion bar energy absorbing seat belt retractor in which a torsion bar having a circular cross section is pre-torqued beyond its yield torque, then released, or a torsion bar with an annular cross section that has not been pre-torqued to achieve the above objects.

Accordingly, the invention comprises: an energy absorbing seat belt retractor comprising: a frame; a torsion bar means rotationally supported relative to the frame for generating a predetermined reaction torque as it is twisted, the torsion bar characterized by an elastic deformation zone and a sharp onset into a plastic deformation zone; a spool operatively connected to rotate with the torsion bar; lock means, adaptable during a vehicle accident and operatively connected to a first portion of the torsion bar for, at least, temporarily stopping the torsion bar and the spool from rotating; the spool having a seat belt positioned thereon, wherein with the lock means activated to prevent the first portion of the torsion bar from rotating and with a load applied to the seat belt, the spool and the torsion bar are rotatable in a direction of seat belt protraction opposed by the reaction force generated by the torsion bar as it twists. In one embodiment of the invention the torsion bar is pre-torqued to create a permanent deformation therein while in another embodiment a torsion bar having an annular construction is used.

Many other objects and purposes of the invention will be clear from the following detailed description of the drawings.

DETAILED DESCRIPTION OF THE DRAWINGS

Figure 1:
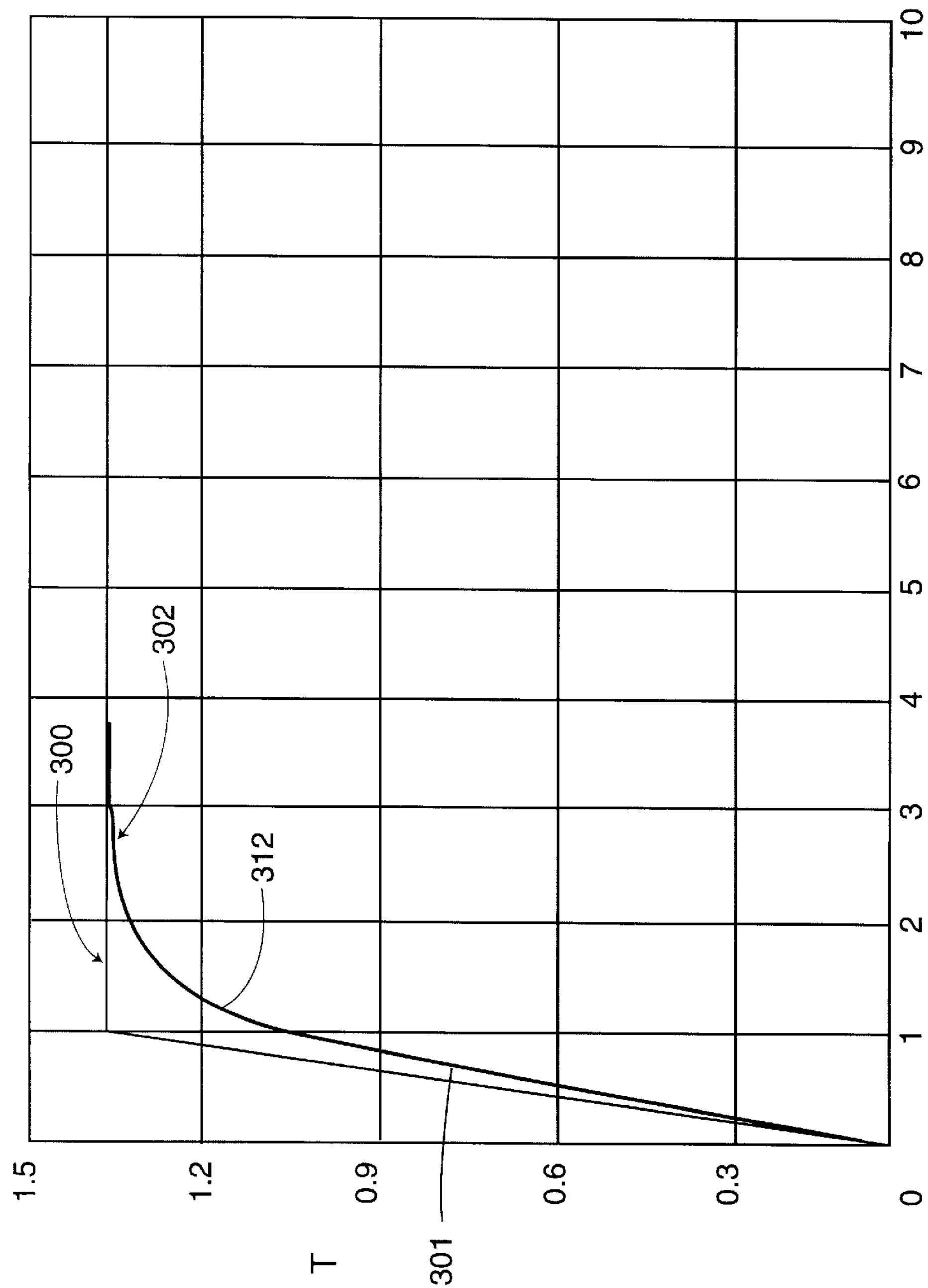
FIG. 1, shows calculated torque-deflection curves for an ideal torsion bar and for a torsion bar having a circular cross section.

Reference is briefly made to curve 300 of FIG. 1 which diagrammatically shows the characteristics of an idealized torsion bar and more specifically the torque generated as a function of a normalized rotation or deflection. As can be appreciated, if this torsion bar were included in a torsion bar retractor 20 such as that shown in FIG. 9 and the seat belt 36 is loaded by the occupant, this type of torsion bar would twist generating a linearly increasing torque (see 301) and then yield a constant reaction force, opposing the occupant belt force, only after a minute amount of twisting, which corresponds to a small amount of seat belt protraction.

In reality the torque (or force) versus deflection (rotation) of a torsion bar having a circular cross section (without pre-torquing) is more accurately approximated by curve 302 of FIG. 1. Curve 302 in FIG. 1 represents a theoretical approximation of the actual torque-deflection curve of a torsion bar having a circular cross section. As can be seen, the transition zone 312 from the elastic to the plastic range of operation is not abrupt. In practice, this means that the torsion bar must be rotated a significantly greater amount to generate the desired reaction force. Consequently, a greater amount of seat belt protraction is needed (or a greater amount of forward motion of the occupant will be required) to generate a reaction force or torque that approximates or approaches the ideal reaction torque with the torsion bar deformed into its plastic region.

Figure 2:
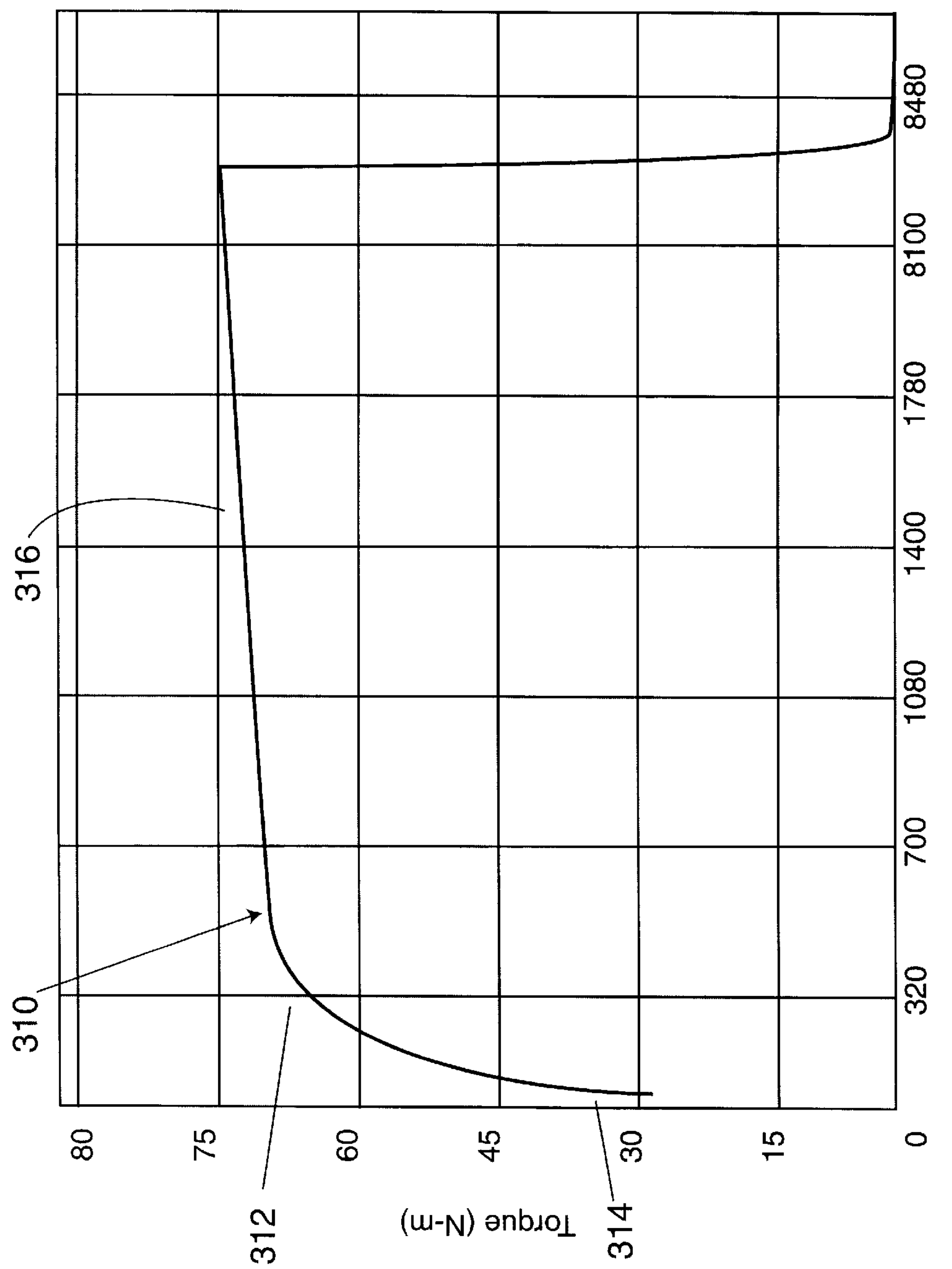
FIG. 2 shows test torque-deflection curve for a torsion bar having a circular cross section.

FIG. 2 shows the torque versus deflection curve of an actual (tested) torsion bar having a circular cross section. As can be appreciated, this curve 310 shows a relatively large transition zone 312, in comparison to the idealized curves 300 and 302, between the elastic 314 and plastic 316 behavior for the torsion bar.

Figure 3:
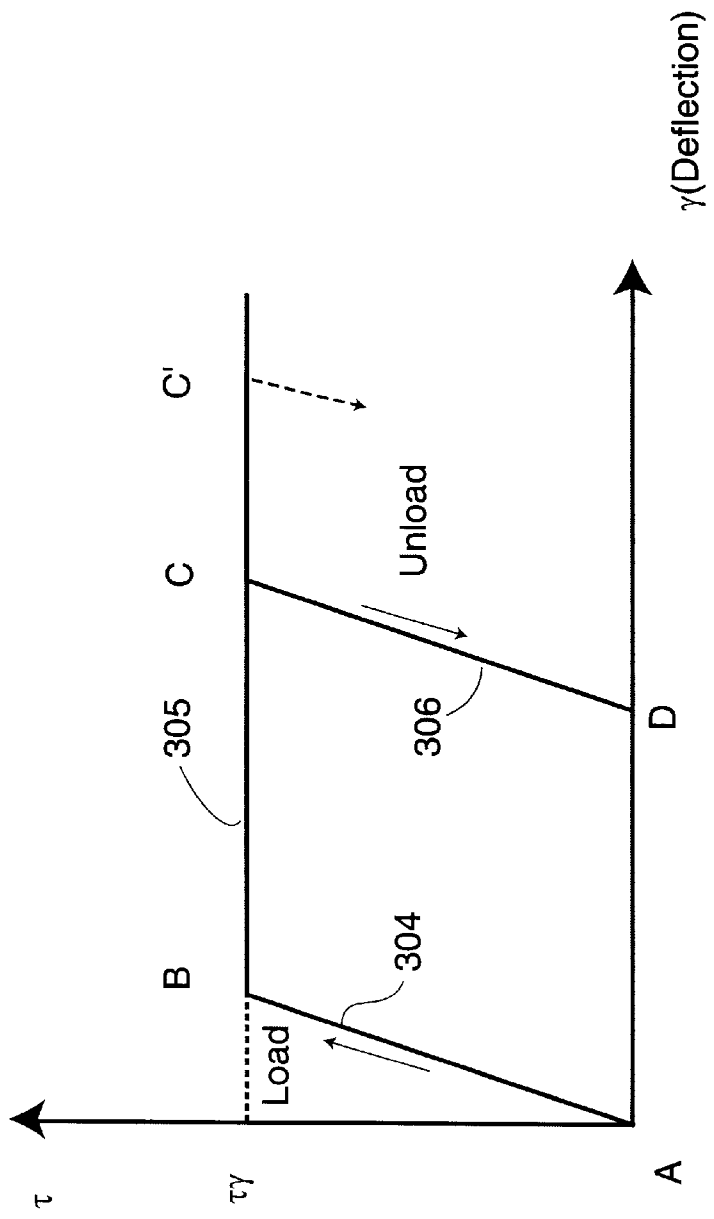
FIG. 3 shows the loading and unloading stress strain model for a torsion bar.

Reference is now made to FIG. 3 which shows the material property, stress strain model of a torsion bar. During loading, the developed stress inside the torsion bar increases linearly with the strain at a slope equal to the shear modulus of the torsion bar's material to the level of its yield shear strength $\tau_y$ and then yields at the constant level, following points A-B-C on curves 304 and 305. When unloaded, the stress decreases from the last load point such as C (or C', etc.) with the same slope, that is the slope is equal to the shear modulus and follows points C-D on curve 306. Two important characteristics of this idealized material are that: firstly, the material stiffness (slope of the curve) after yield is zero; secondly, when the stresses during loading pass the yield point, permanent deformation will remain after the stress is reduced to zero as shown diagrammatically by point D in FIG. 3.

Figure 4:
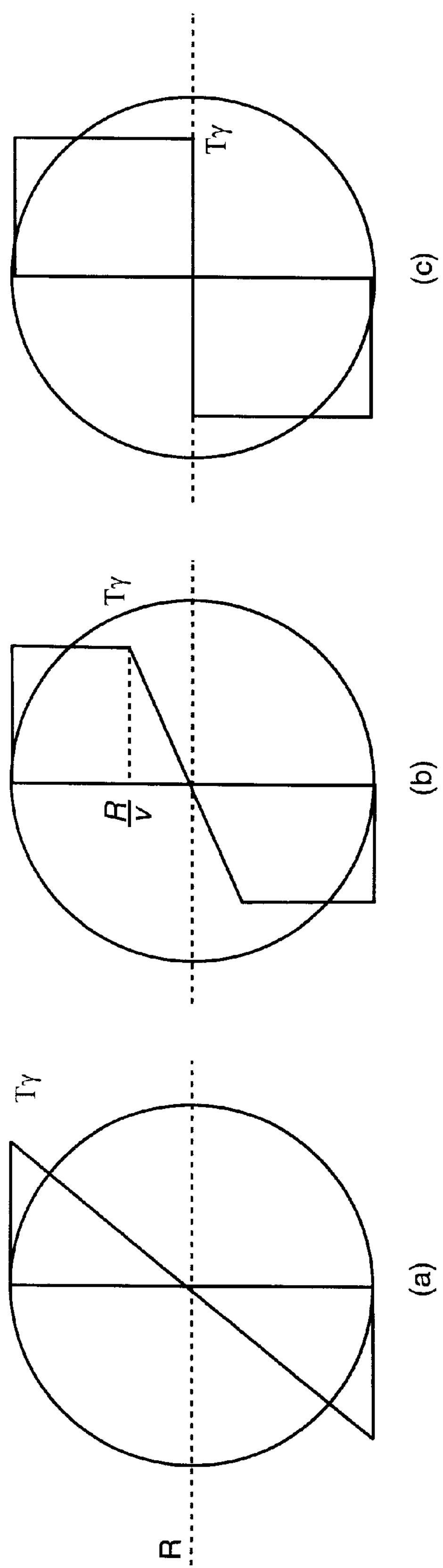
FIGS. 4*a*–4*c* illustrate the stresses developed within a torsion bar having a circular cross section as it is torqued or twisted above its yield stress.

Reference is now made to FIGS. 4*a*–4*c* which illustrate the stresses developed within a torsion bar having a circular cross section when it is torqued above yielding. For a torsion bar having a circular cross section that is torsionally loaded, the shearing stress, $\tau$, in a cross section of the bar varies linearly along the radius of the cross section with the maximum stress developed only on the outer surface until the yield strength is reached. This stress distribution is represented by FIG. 4*a*. It can be shown that within this stage the torque applied to the shaft versus the twist angle of the shaft follows a linear relationship with a sharp slope until the torque reaches the yield torque (which is generally shown in region 301 of FIG. 1 and in region 314 of curve 310 of FIG. 2). Within this stage the torsion bar behaves with the maximum stiffness (sharp slope of the torque-deflection curve) because all of the material inside the torsion bar behaves elastically. At the yield torque, the maximum stress at the outer surface reaches the yield strength and the outer surface becomes the yield surface. When the applied torque increases above the yield torque, according to the material property shown in FIG. 3, more material deeper inside the yield surface will be stressed to the yield level and the yield surface migrates towards the center as shown in FIG. 4*b*. Within this stage the stiffness (slope of the torque deflection curve) of the torsion bar gradually decreases since less and less material inside the torsion bar behaves elastically (which is also shown by curve 302 in FIG. 1 and curve 310 in FIG. 2). With further increase of the applied torque to a level at which the yield surface reaches the center of the circular cross section, all material is under plastic behavior, as shown in FIG. 4*c*. The stiffness of the torsion bar becomes zero and the torque reaches the constant level (which is also shown by curve 300 and 302 in FIG. 1). It is this process of the migration of the yield surface from the outer surface to the center of the torsion bar that causes the transition zone 312 and requires an added amount of rotation to place the material in its plastic zone.

A goal of this invention is to provide a torsion bar which reduces the amount of rotation needed to place the torsion bar in its plastic zone so that when it is installed within a seat belt retractor the retractor will generate a reaction torque which approaches the generally constant torque achievable in the ideal case. Two embodiments are presented, one is a pre-torqued torsion bar having a circular cross section and the another is a torsion bar having an annular cross section.

Figure 5A:
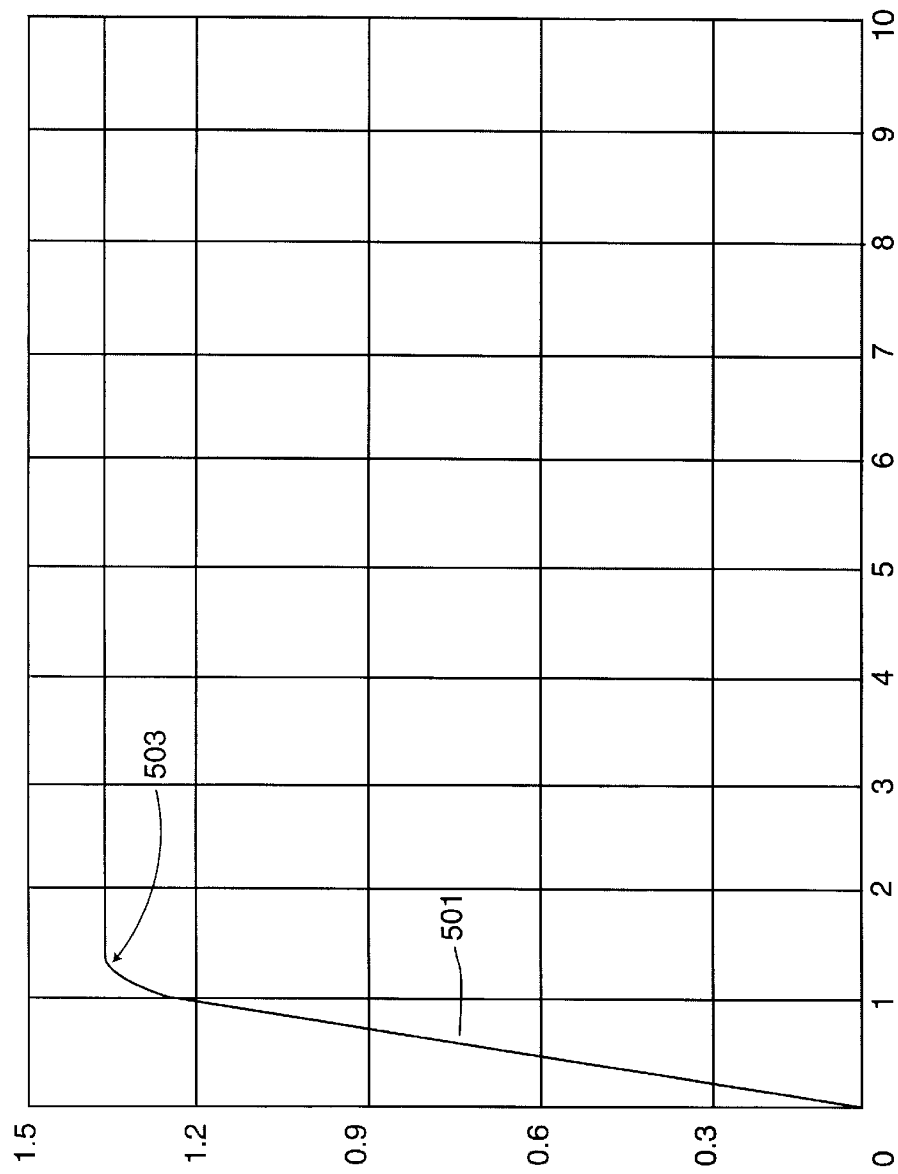
FIG. 5*a* shows a calculated torque-deflection curve of a pre-torqued torsion bar having a circular cross section.
Figure 5B:
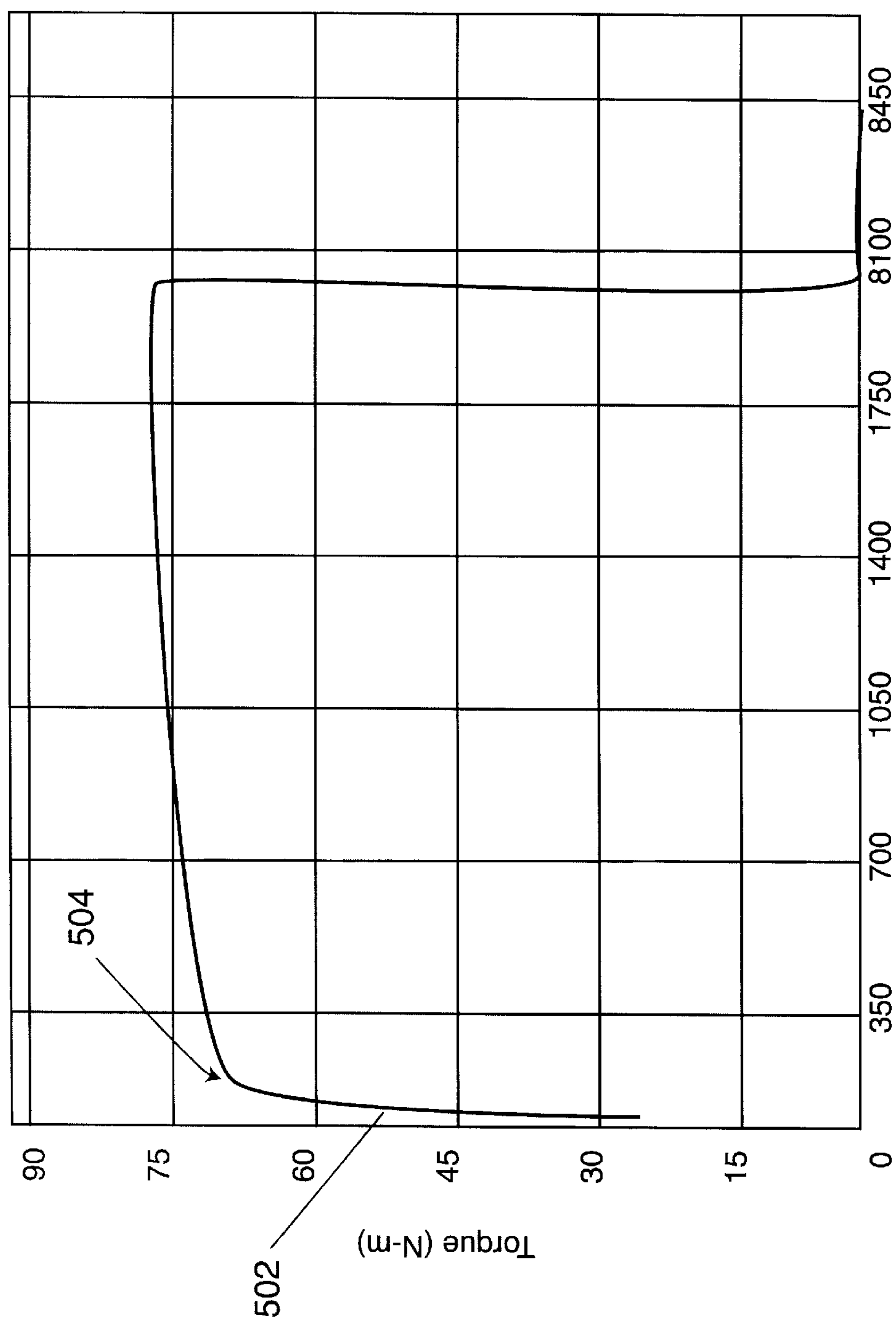
FIG. 5*b* shows a test torque-deflection curve for a pre-torqued torsion bar having a circular cross section.

Reference is made to FIGS. 5*a*-5*b*. FIG. 5*a* shows the calculated torque deflection curve of the ideal torsion bar. FIG. 5*b* is a torque deflection curve based on test data for a pre-torqued torsion bar having a circular cross section . In this invention the pre-torquing process is performed before assembling the torsion bar into the seat belt retractor. More particularly, the torsion bar is torqued to a level above its yield torque, in the direction the torsion bar would twist during the protraction of the seat belt. Subsequently, the torque is released. At this level of torque (and corresponding stress) the torsion bar will exhibit some permanent deformation. As can be seen from the results of both the theoretical calculation and the tests, the resulting torque deflection curve exhibits a generally linear elastic zone with an abrupt transition to the plastic zone. Further, it can be appreciated that the extent of the transition zone has been drastically shortened and as such the amount of rotation (of the torsion bar) needed to place the bar sufficiently close to its plastic zone has been drastically reduced in comparison to the theoretical and test data of the torsion bar (that has not been pre-torqued) shown in FIGS. 1 and 2. As such, were this pre-torqued torsion bar installed within the retractor, less protraction (less occupant movement) would be needed to raise the reaction torque and internal stress to its plastic region and the reaction torque generated as the webbing is controllably protracted would be higher than that of a torsion bar that had not been pre-torqued for a given amount of twist.

Figure 6:
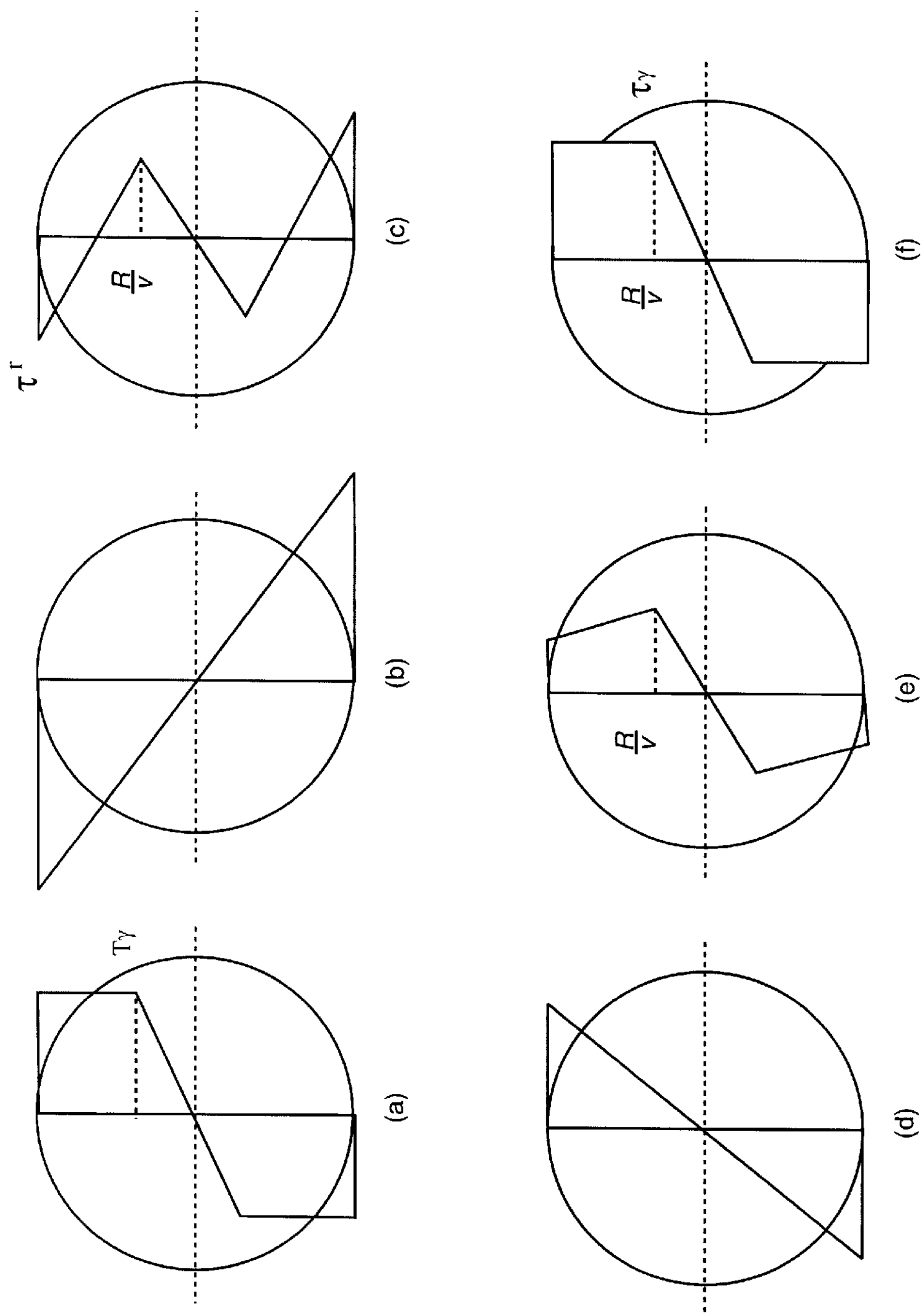
FIGS. 6*a*–6*f* illustrate the stresses developed within a torsion bar having a circular cross section as it is torqued or twisted above yielding in the pre-torquing process and subsequently loaded such as by a seat belt within a retractor.

Reference is made to FIGS. 6*a*–6*c* which illustrate the physical effects that occur with the torsion bar as it is pre-torqued. As mentioned above, the primary contributor to the creation of a large transition zone in the torque deflection curve (of a torsion bar having a circular cross section) is the fact that the yield surface moves or migrates as the bar is twisted. The migration of the yield surface is due to the non-uniform stress distribution shown in FIG. 4*a*, discussed above. If, however, the stresses in the entire cross section, or a larger portion of the cross section, during loading (of the torsion bar) could reach the yield strength simultaneously, no transition zone, or at least a smaller transition zone, would occur. This pre-torquing process provides a means to change the stress distribution during seat belt protraction such that the stresses in the entire or a large portion of the cross section of the torsion bar can reach the yield strength simultaneously. FIG. 6*a* duplicates FIG. 4*b* and shows the stress distribution in the torsion bar when it is being pre-torqued beyond the yield point with a yield surface located, that is, migrated to a radius R/v (v>1 is a parameter that corresponds to the depth of the yield surface and R is the radius of the torsion bar having the circular cross section). FIG. 6*b* shows the stress release distribution during unloading in the pre-torque process. The consequence of the pre-torque process is that after unloading, the stress inside the torsion bar does not vanish due to the non-uniform permanent deformation in the torsion bar. The residual stress distribution (see FIG. 6*c*) existing in the torsion bar is the superposition of stresses generated in pre-torquing and unloading steps as shown in FIGS. 6*a* and 6*b*. An important characteristic of the residual stresses is that the distribution of these stresses, near the outer surface of the torsion bar, are designed to be in the direction opposite to the direction the torsion bar would twist during the protraction of the seat belt. When the pre-torqued torsion bar is assembled in the retractor and is loaded by the occupant, the seat belt will protract, and the total stress inside the torsion bar is the superposition of the residual stress and the stress generated by the belt load having the distribution shown in FIG. 6*d*. Due to the residual stress, the maximum stress in the pre-torqued bar is no longer located at the outer surface, as illustrated in FIG. 6*e*, but at a location created in pre-torque process R/v. With further increase of the applied torque, the stresses in the range from the location R/v to the outer surface will reach the yield strength simultaneously as shown in FIG. 6*f*. Before reaching yield, the applied torque versus the twist angle of the torsion bar follow the linear relationship as shown by region 501 in FIG. 5*a* and region 502 in FIG. 5*b* (which shows test data). After yield, a further increase of the applied torque will cause the yield surface to further migrate towards and finally reach the center. Since the distance for migration of the yield surface is shorter than with a torsion bar without the pre-torque process, the entire torsion bar will reach plastic behavior sooner and the transition zone is reduced, as shown by curve 503 in FIG. 5*a* and curve 504 in FIG. 5*b*. As a result, a generally constant torque can be obtained with less angular deflection in the pre-torqued torsion bar than in a torsion bar that has not been pre-torqued.

In view of the above, a pre-torqued torsion bar 70 having a circular cross section can be incorporated within an energy absorbing seat belt retractor. Following the above, the torsion bar is first twisted or pre-torqued in the same direction (clock-wise or counter clock-wise) that it would be twisted when subjected to the occupant's load transmitted from the seat belt to the spool. In this embodiment the level of pre-torquing should be sufficient to move the torsion bar out of its elastic zone and more particularly, pre-torqued to a level in excess of the yield stress $\tau_y$ so that the bar is operating in the transition or the plastic zones.

In a second energy absorbing retractor, a torsion bar having an annular cross section is proposed. As will be seen, the benefit of using this type of torsion bar is that the transition zone is much smaller than that achieved with the circular cross sectioned torsion bar and that this smaller transition zone can be achieved without the need of pre-torquing the torsion bar, albeit this type of torsion bar can also be pre-torqued. As mentioned above, a key factor which contributes to the extended transition zone 312 for the circular cross sectioned torsion bar is simply that the yield surface must migrate through the entire cross section before a completely plastic behavior is achieved. To achieve this condition the torsion bar must be substantially twisted; the degree of twist will vary with the material used. The use of a torsion bar having an annular cross section reduces the migration distance of the yield surface and therefore shortens the transition zone.

Figure 7:
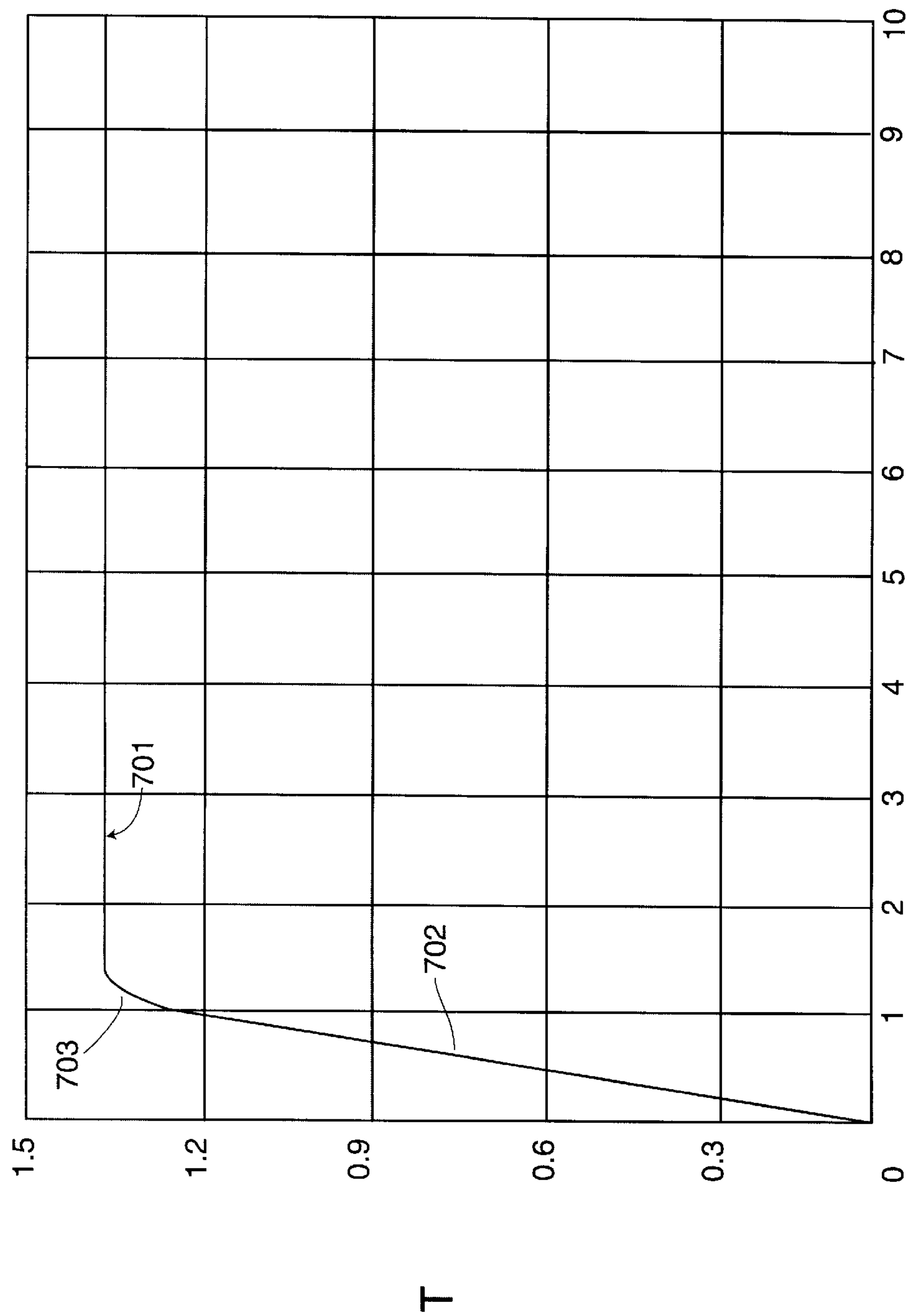
FIG. 7 shows a calculated torque-deflection curve of a torsion bar having an annular cross section.

Reference is made to FIG. 7 which shows the calculated torque (vertical axis) deflection (horizontal axis) curve 701 of an ideal torsion bar having an annular cross section which, as shown below, significantly reduces the transition zone. As can be seen the theoretical torque-deflection curve 701 exhibits a generally linear elastic zone with an abrupt transition to the plastic zone. As such, were this torsion bar installed within the retractor, less protraction (less occupant movement) would be needed to raise the reaction torque and internal stress to its plastic region and the reaction torque generated as the webbing is controllably protracted would be higher than that of a torsion bar, that has not been pre-torqued, having a circular cross section for a given amount of twist.

FIGS. 8*a*–8*c* show the stresses developed in a torsion bar having a hollow annulus or bore of radius $R_i$ and an outer radius of $R_o$. As can be appreciated, the wall thickness of this type of torsion bar is drastically smaller in comparison to a circular torsion bar of the same radius. When the annular torsion bar is loaded up to its yield torque, the outer layer of the material will be first stressed up to the yield strength of the material and will begin to yield as shown in FIG. 8*a* (in the same manner as described above for the circular cross sectioned torsion bar). In this stage the torque applied to the shaft versus the twist angle of the shaft follows a linear relationship with a sharp slope until the torque reaches the yield torque (which is generally shown in region 703 of FIG. 7). Subsequently, this exterior yield surface will migrate into the material until it reaches the inner radius Ri with increases in the applied torque as shown in FIG. 8*b*. By virtue of the thin wall thickness of the annular torsion bar, it will take a relatively small amount of added applied torque and subsequent deflection (twisting) to create a plastic zone through the entire cross section. This type of annular construction will generate a rapid transition, i.e. a smaller transition zone, into the plastic zone of operation in comparison to the torsion bar having a circular cross section.

Figure 9:
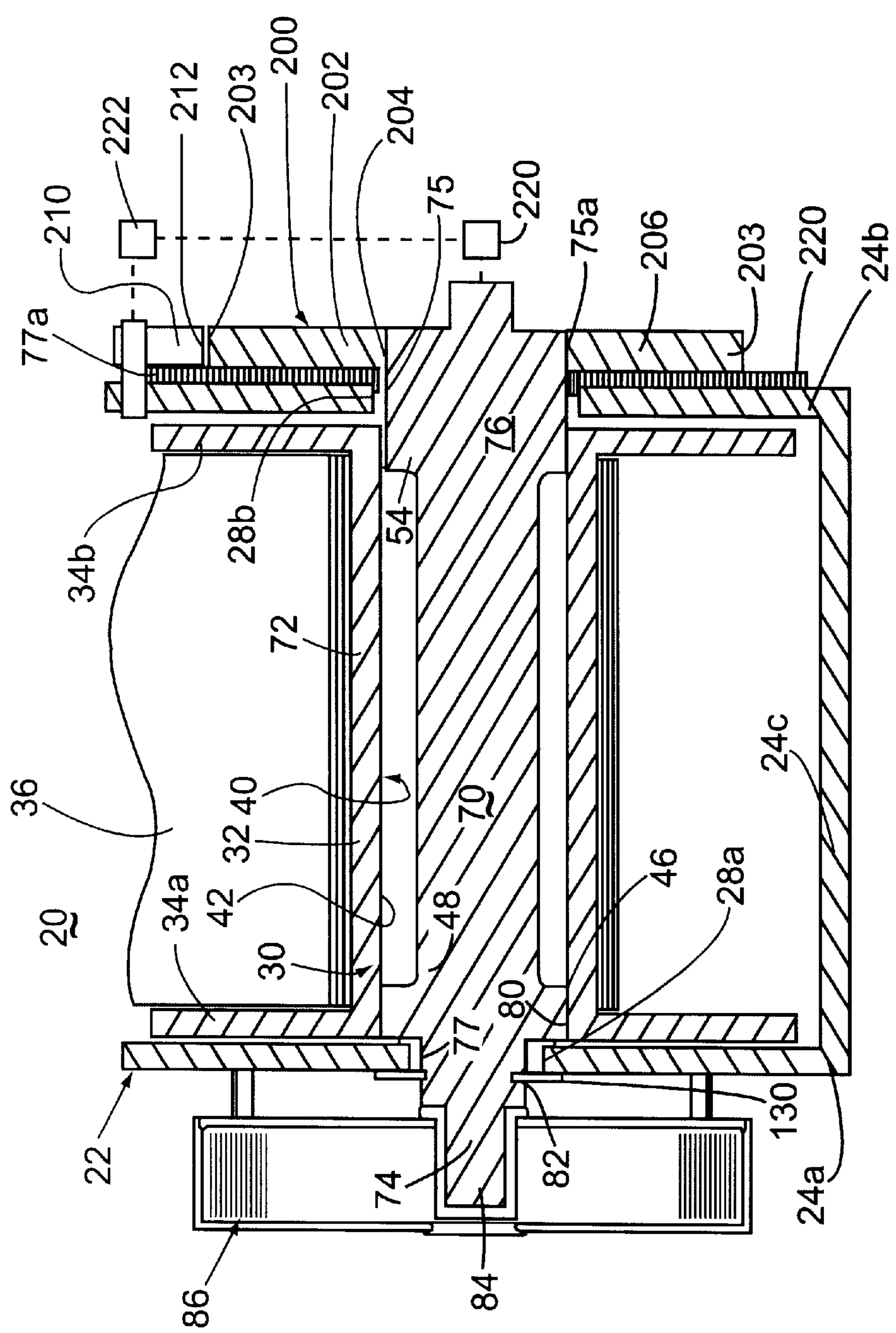
FIG. 9 shows a seat belt retractor incorporating a torsion bar of the present invention.

Reference is made to FIG. 9 which generally shows the construction of the major components of a torsion bar, energy absorbing seat belt retractor 20 which can be adopted for use with the present invention. The retractor 20 comprises a frame 22 with first and second sides 24*a, b* and a back 24*c*, each of the first and second sides includes a first opening 28*a, b*. The retractor 20 also includes a hollow spool 30 rotationally supported upon the frame 22. The spool 30 includes a center body 32 and opposing flanges 34a and 34*b* at respective ends of the center body 32. The center body 32 includes means such as a slot (not shown) of known construction for receiving and securing an end of a length of seat belt (seat belt webbing) 36. The center body is hollow and includes a bore 40.

A torsion bar 70 is located within the bore 40. The torsion bar includes a center body 72. A first end 74 of the torsion bar 70 extends through opening 28a in side 24*a*. End 74 may be supported by an optional bushing 77 inserted in opening 28*a*. The end 74 includes splines 80 (which fit in splines 46), a groove 82 and a spring arbor 84 engageable with a rewind spring 86. The other end of the spring is fixedly attached relative to the frame so as not to move. The torsion bar also includes a second end 76 which is secured to a part of a lock wheel assembly 200. End 76 includes splines 75.

Emergency locking retractors (ELRs) include a variety of lock wheel assemblies. The precise type for use in the present invention is not particularly important other than, in this embodiment, that a lock wheel needs to be joined to end 76 of the torsion bar such as a complementary set of splines 75*a*. As is known in the art, the lock wheel assemblies include a means for causing a locking pawl to be brought into engagement with teeth on the lock wheel to halt the protraction of the seat belt. Such means typically includes the use of a vehicle or inertia sensor to sense vehicle deceleration above a predetermined level and a web sensor which is activated to initiate the locking of the retractor when the seat belt (webbing) is withdrawn from the spool at a rate in excess of a determinable level. The locking assemblies may use one or more plastic sensor pawls which engage a plastic or metal ratchet wheel which in turn couples a lock cup to the retractor shaft (in the present case to the torsion bar). Having coupled the lock cup to the shaft (torsion bar) the lock cup rotates. The motion of the lock cup moves a load absorbing, typically metal, locking pawl into engagement with a load absorbing metal lock wheel, thus halting, if only temporarily (when using energy absorbing components such as a torsion bar), the protraction of the seat belt. One such lock wheel assembly that is usable with the present invention is disclosed in U.S. No. Pat. 5,529,258 or EP 0228729 which are incorporated herein by reference.

Figure 8:
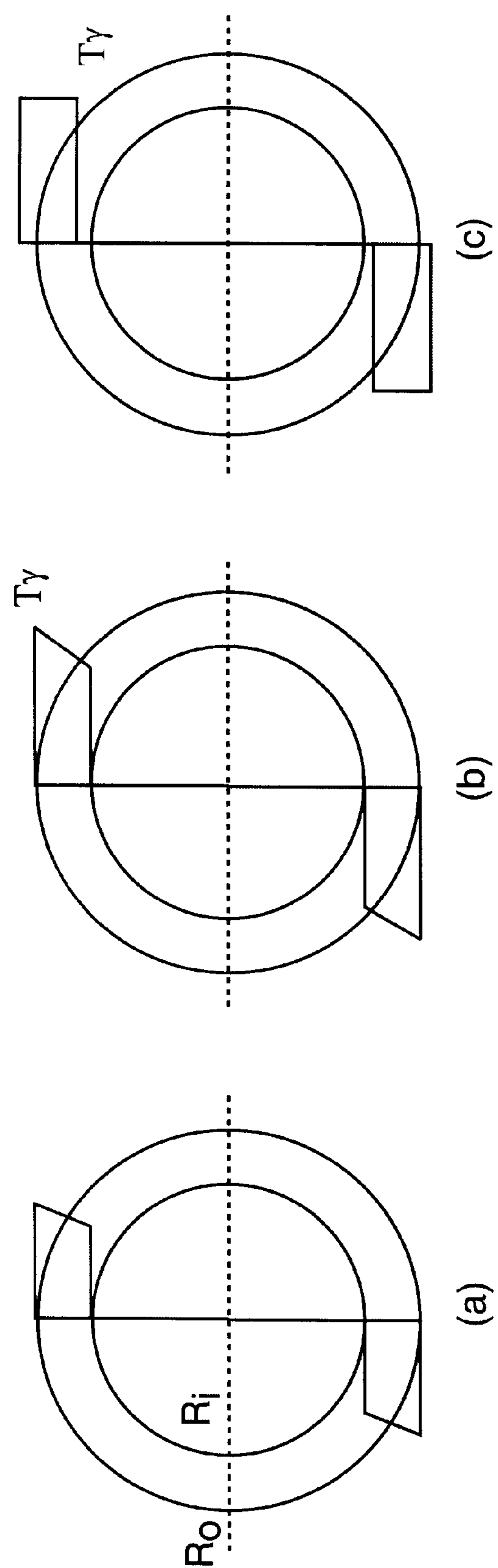
FIGS. 8*a*–8*c* show the stresses developed within an annular cross sectioned torsion bar.

The lock wheel assembly 200 is shown diagrammatically and includes a lock wheel 202 having a splined bore 204 with splines 75*a*. The splines 75 of the torsion bar 70 are press fit within the bore 204 and permanently secured thereto in a known manner. This orientation prohibits the relative rotation of the lock wheel 202 and the end 76 of the torsion bar 70. As can be seen in FIG. 8, a portion of the torsion bar 70 extends through opening 28*b* in the frame side 24*b*. An optional bushing 77*a* may be inserted in the opening 28*b* to support the torsion bar 70. The illustrated lock wheel assembly further includes a lock pawl 210, having a locking tooth or formation 212 thereon to engage the teeth 203 on the lock wheel. The lock pawl 210 is rotationally supported on the frame such as on frame side 24*b*. The lock wheel assembly 200 includes a web sensor 220 that is coupled to sense the speed of rotation of the spool 30. As illustrated the web sensor is coupled to the torsion bar 70, the speed of which (prior to lockup) is that of the spool. The lock wheel assembly further includes a vehicle sensor 222. As mentioned above, the specific implementation of the web and vehicle sensors will vary, however, this is known in the art. Whenever either the vehicle or the web sensor is activated the lock pawl 210 is brought, via known mechanisms, into locking engagement with a lock wheel 202.

The torsion bar 70 is fixed in place by inserting a locking ring 130 within a groove 82 formed on end 74 of the torsion bar. The rewind spring 86 and sensors 220 and 222 are mounted to the retractor 20 in a known manner.

Figure 10:
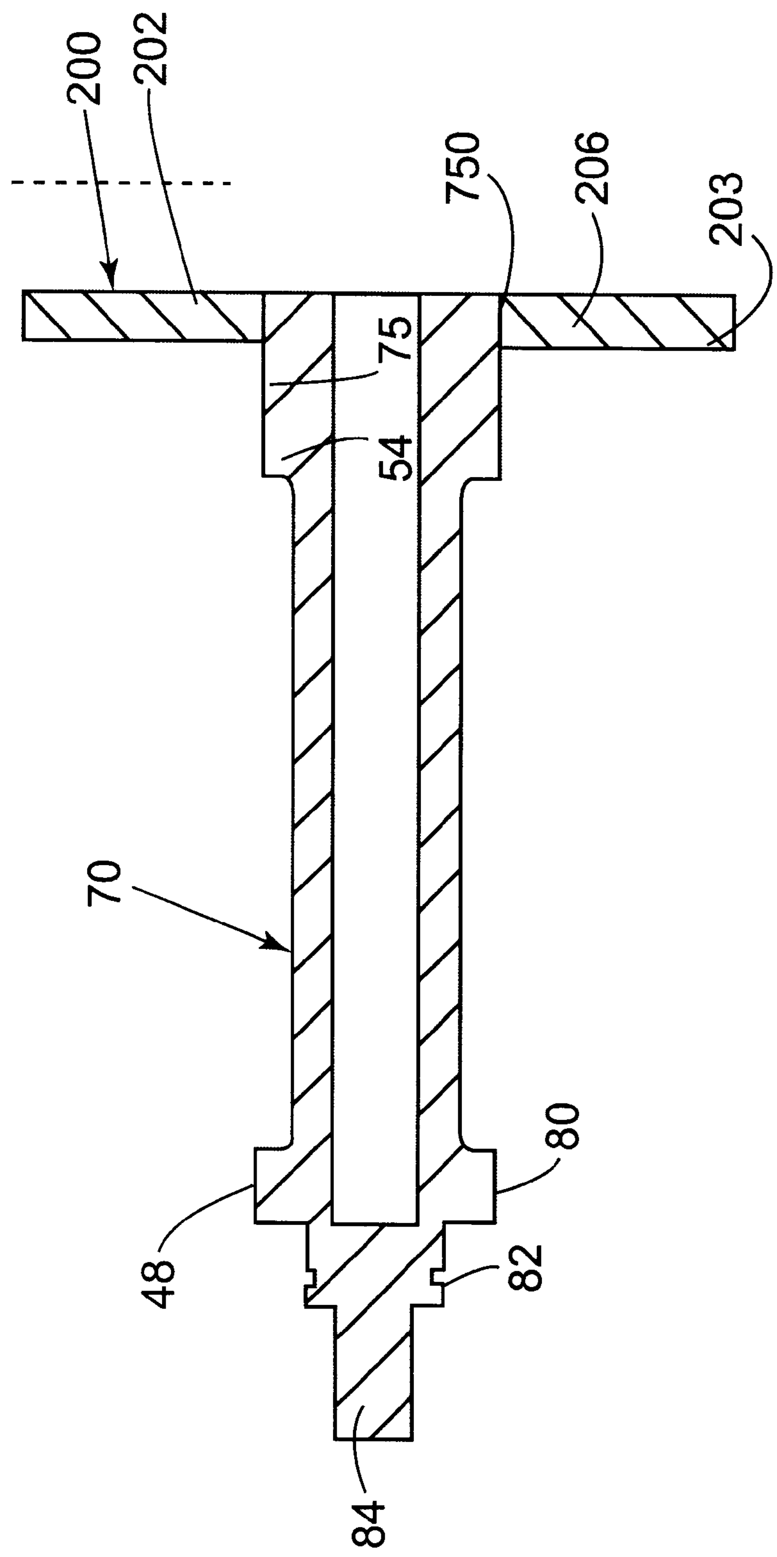
FIG. 10 is a cross sectional view of an annular torsion bar attached to a lock wheel.

The operation of the retractor 20 is generally the same of that outlined above. The end of the torsion bar 70 is locked from further rotation and the seat belt is loaded as the occupant moves or attempts to move forward. The occupant load is transferred to the spool 30, whose motion is opposed by the reaction torque generated as the other end 74 is rotated. FIG. 10 illustrates an annular torsion bar 70' attached to a lock wheel 202.

Many changes and modifications in the above described embodiment of the invention can, of course, be carried out without departing from the scope thereof. Accordingly, that scope is intended to be limited only by the scope of the appended claims.

We claim:

1. An energy absorbing seat belt retractor (20) comprising:

a frame (22);

a torsion bar means (70,70') rotationally supported relative to the frame for generating a predetermined reaction torque as it is twisted, the torsion bar characterized by an elastic deformation zone and a sharp onset into a plastic deformation zone;

a spool operatively connected to rotate with the torsion bar means;

a seat belt positioned on the spool;

lock means (200), adaptable during a vehicle accident and operatively connected to a first portion of the torsion bar for, at least, temporarily stopping the torsion bar and the spool from rotating;

wherein with the lock means activated to prevent the first portion of the torsion bar from rotating and with a load applied to the seat belt, the spool and the torsion bar are rotatable in a direction of seat belt protraction opposed by the reaction torque generated by the torsion bar as it twists.

2. The device as defined in claim 1 wherein the torsion bar means is subjected to a pre-torque, prior to installation within the retractor, sufficient to stress at least a portion of the torsion bar means at least to its yield stress level causing a permanent deformation in the torsion bar means, the pre-torque generating a residual stress in a predetermined direction.

3. The device as defined in claim 2 wherein the direction of residual stress, after achieving the pre-torque in the torsion bar means is in a direction opposite to a direction the spool and torsion bar twist upon being loaded with the lock means activated.

4. The device as defined in claim 1 wherein the torsion bar means includes an annular portion.

5. The device as defined in claim 1 wherein the torsion bar means is treated, prior to assembly into the retractor, to create a permanent deformation in the torsion bar means.

6. The retractor as defined in claim 1 wherein the torsion bar means has a circular cross section.

7. An energy absorbing seat belt retractor (20) comprising:

a frame (22);

a spool and a seat belt, a portion of which is stored on the spool;

a torsion bar (70,70') having a first and a second side, rotationally supported relative to the frame, the torsion bar of the type that is subjected to a pre-torque of at least to the level of the yield stress, in the direction the torsion bar would twist during protraction of the seat belt to reduce a transition zone between the torsion bar's elastic and plastic deformation regions;

lock means (200), adapted to be activated during a vehicle accident and operative on the first side (76) of the torsion bar to stop the torsion bar from rotating;

a spool operatively connected to the second side of the torsion bar, the spool having a seat belt positioned thereon, wherein with the lock means activated to prevent the first side of the torsion bar from rotating and with a predetermined load communicated to the seat belt, the spool and the torsion bar rotate in a direction of belt protraction opposed by a reaction force generated by the pre-torqued torsion bar as it twists.

8. The retractor as defined in claim 7 wherein the torsion bar has an annular cross section.

9. The device as defined in claim 7 wherein the torsion bar is treated before assembly into the retractor to create permanent deformation in the torsion bar.

10. The device as defined in claim 1 wherein the torsion bar means is subjected to a pre-stress prior to installation within the retractor, sufficient to stress at least a portion of the torsion bar means at least to its yield stress level causing a permanent deformation in the torsion bar means, the pre-stress generating a residual stress in a predetermined direction.

11. The device as defined in claim 10 wherein the direction of residual stress, after achieving the pre-stress in the torsion bar means is in a direction opposite to a direction the spool and torsion bar twist upon being loaded with the lock means activated.

12. An energy absorbing seat belt retractor (20) comprising:

a frame (22);

a torsion bar (70,70') having a first and a second side, the torsion bar characterized by an elastic deformation zone and a sharp onset into a plastic deformation zone, the torsion bar rotationally supported relative to the frame, the torsion bar of the type that is subjected to a pre-stress of at least to the level of a yield stress of the torsion bar, in a direction the torsion bar would twist during protraction of the seat belt to reduce a transition zone between the torsion bar's elastic and plastic deformation zones:

lock means (200) adapted to be activated during a vehicle accident and operative on the first side (76) of the torsion bar to stop the torsion bar from rotating;

a spool operatively connected to the second side of the torsion bar, the spool having a seat belt positioned thereon, wherein with the lock means activated to prevent the first side of the torsion bar from rotating and with a predetermined load communicated to the seat belt, the spool and the torsion bar rotate in a direction of belt protraction opposed by a reaction force generated by the pre-stressed torsion bar as it twists.

13. The device is defined in claim 12 wherein the torsion bar is treated before assembly into the retractor to create permanent change in the elastic and plastic deformation zones of the torsion bar.

* * * * *